(12) United States Patent
Gobbo

(10) Patent No.: US 6,801,249 B1
(45) Date of Patent: Oct. 5, 2004

(54) DEVICE FOR EMITTING A TIME VARYING SIGNAL IN THE FIELD OF VISION OF A PICTURE TAKING DEVICE

(75) Inventor: Gilles Gobbo, Aucamville (FR)

(73) Assignee: Aerospatiale Matra Airbus, Paris (FR)

( * ) Notice: Subject to any disclaimer, the term of this patent is extended or adjusted under 35 U.S.C. 154(b) by 0 days.

(21) Appl. No.: 09/522,295

(22) Filed: Mar. 9, 2000

(30) Foreign Application Priority Data

Apr. 16, 1999 (FR) .............................................. 99 04776

(51) Int. Cl.[7] .............................................. H04N 5/228
(52) U.S. Cl. ............................ 348/208.14; 348/208.15; 348/208.4
(58) Field of Search ....................... 348/207.99, 208.14, 348/208.15, 208.16, 222.1, 333.02, 148, 154, 155, 25, 187, 189, 61, 132, 208.4, 208.13; 382/103, 107; 340/948, 953

(56) References Cited

U.S. PATENT DOCUMENTS 4,483,599 A 11/1984 MacRae et al.
5,459,793 A * 10/1995 Naoi et al. .................. 382/165
5,687,930 A * 11/1997 Wagner et al. .............. 382/165

FOREIGN PATENT DOCUMENTS

GB 2237699 A * 5/1991 ........... G01S/03/78
WO 98 30978 7/1998

OTHER PUBLICATIONS

Patent Abstracts of Japan, vol. 18, No. 83 (M–1558), Feb. 10, 1994 & JP 05 294292 A, Nov. 9, 1993.

* cited by examiner

Primary Examiner—Aung Moe
(74) Attorney, Agent, or Firm—Stevens, Davis, Miller & Mosher, LLP

(57) ABSTRACT

A device for emitting digital video images may include a picture-taking unit for producing the images and a unit for forming at least one signal in the field of vision of the picture-taking unit so that the signal appears in at least some of the images produced by the picture-taking unit. The signal is formed to vary temporally, making it possible to detect any image freeze emitted by the device.

10 Claims, 1 Drawing Sheet

DEVICE FOR EMITTING A TIME VARYING SIGNAL IN THE FIELD OF VISION OF A PICTURE TAKING DEVICE

FIELD OF THE INVENTION

The present invention relates to a device for emitting digital video images.

BACKGROUND OF THE RELATED ART

Although not exclusively, such a device comprising picture-taking means of the video camera type is intended more particularly to be mounted on an aircraft, especially a civil transport airplane, so as to produces images of the environment outside the aircraft and in particular of the environment fore and/or aft of the latter, which images are transmitted on a screen visible to a pilot of the aircraft.

Such a device allows, in particular, the pilot:
  to have real-time vision of the positioning of the aircraft with respect to its environment on the ground; and
  to aid the guidance of the aircraft, in particular when the latter is taxiing on a runway of an airport before takeoff or after landing, thus making it possible, despite the reduced handlability of the aircraft on the ground, to avoid a departure from the runway and in particular a departure of the rear wheels.

It is preferable to use digital images for this purpose. This is because it is known that digital images are not sensitive to interference, thereby engendering increased quality and increased reliability as compared with standard analog images. Moreover, digital images may be processed directly much more simply than analog images.

However, the generating of digital video images has a significant drawback: the risk of image freeze, that is to say the risk of continuous screening of the same image rather than of nonidentical successive images.

The origin of this image freeze may be a problem with one of the various steps (generation, storage, display, etc.,) for acquiring and processing the images and generally results from a defective zeroing of a video memory. This risk is accentuated by the ever greater complexity of video image emission devices, which may in particular implement varied and complex processing operations, such as image compression or the generation of "mosaics" from several video sources.

Image freeze may have unfortunate consequences, especially in the aforesaid example, relating to the guidance of an airplane on the ground, since, the successive images generally not exhibiting significant differences, the pilot has difficulty in distinguishing between a motionless image and a frozen image, and this may induce him to make guidance errors.

Various solutions to detecting image freeze are known.

A first solution consists in erasing on each occasion the video memories between two successive images. However, this solution requires erasure logic with accurate time references so that the erasure can be carried out at the appropriate moment. Moreover, such logic has to be provided for each of the various video memories of the image emission device.

A second solution consists in comparing on each occasion two successive images. However, this solution requires duplication of the video memories so as to be able to preserve two successive images and moreover the provision of a comparator and associated processing logic. Moreover, in the case where the scene filmed is actually stationary, it is possible to have two identical consecutive images, so that this second solution then leads to erroneous detection of image freeze.

Consequently, none of these known solutions is satisfactory, all the more so since in the case of the aforesaid application to the guidance of an aircraft on the ground, with visual restoration fore and/or aft of the aircraft, these standard solutions render the on-board system more complicated and/less reliable.

SUMMARY OF THE INVENTION

The object of the present invention is to remedy these drawbacks. It relates to a device for emitting digital video images making it possible to detect any image freeze simply and reliably.

For this purpose, according to the invention, said device for emitting digital video images, comprising picture-taking means, is noteworthy in that it furthermore comprises means for forming at least one signal in the field of vision of said picture-taking means, so that said signal appears in at least some of the images produced by said picture-taking means, and in that said signal is formed in such a way as to vary temporally.

Thus, by virtue of the invention, while the signal is varying in the restored images, one is aware that normal unreeling of successive video images is occurring. On the other hand, as soon as said signal remains identical (and possibly absent) for a determined duration, the existence of a frozen image is detected.

The device in accordance with the invention thus makes it possible to detect visually, in a simple and reliable manner, any image freeze.

Furthermore, advantageously:
  said signal is an intermittent signal, that is to say a signal which disappears and reappears at regular time intervals; and/or
  said signal is formed in such a way as to appear at variable locations and/or in variable shapes in successive images produced by said picture-taking means.

Moreover, advantageously, said signal is formed in such a way as to appear, on each occasion, in a zone of the image, for example a corner of the image, where it does not impede the visual restoration of the scene represented in said image.

Said means for forming at least one signal may be incorporated into said picture-taking means. In this case, they are preferably miniaturized.

However, preferably, for safety, said means for forming at least one signal are exterior to said picture-taking means and independent of the latter. Thus, they are completely decoupled from said picture-taking means.

In an exemplary embodiment, said means for forming at least one signal may then comprise:
  a generator of light pulses; and
  an optical fiber linked to said generator of light pulses and arranged in such a way as to transmit in the field of vision of said picture-taking means the light pulses emitted by said generator of light pulses and representing said signal.

They may also, as a variant, comprise:
  an element able to be moved in the field of vision of the picture-taking means; and
  a means of moving said element, said element being moved in such a way as to appear intermittently, and possibly at variable locations, in successive images produced by said picture-taking means and to represent said signal.

BRIEF DESCRIPTION OF DRAWINGS

The figures of the appended drawing will clearly elucidate the manner in which the invention may be embodied. In these figures, identical references denote similar elements.

DETAILED DESCRIPTION OF THE INVENTION

Figure 1:
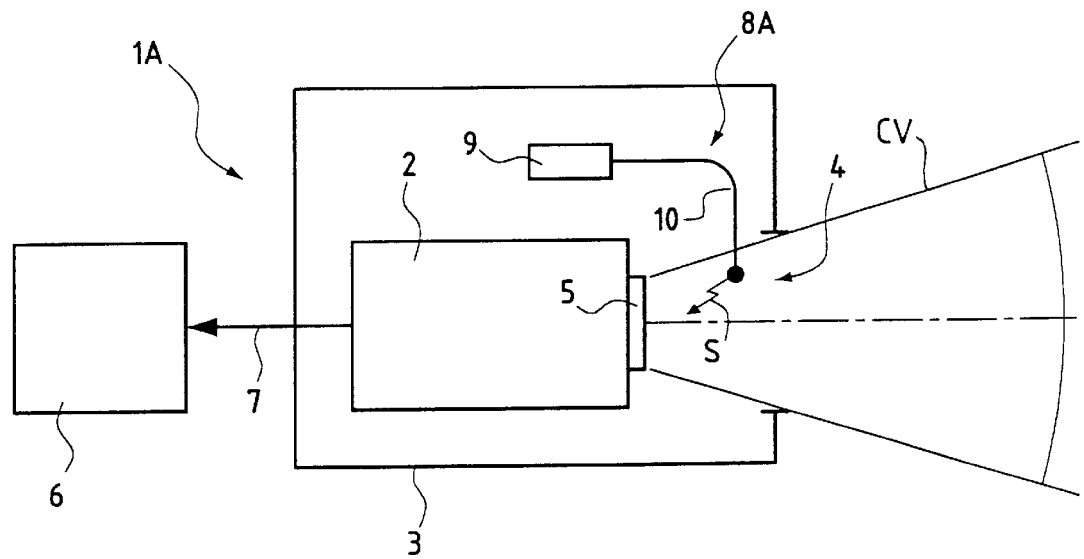
FIGS. 1 and 2 respectively show, schematically, two different embodiments of a device for emitting digital video images, in accordance with the invention.
Figure 2:
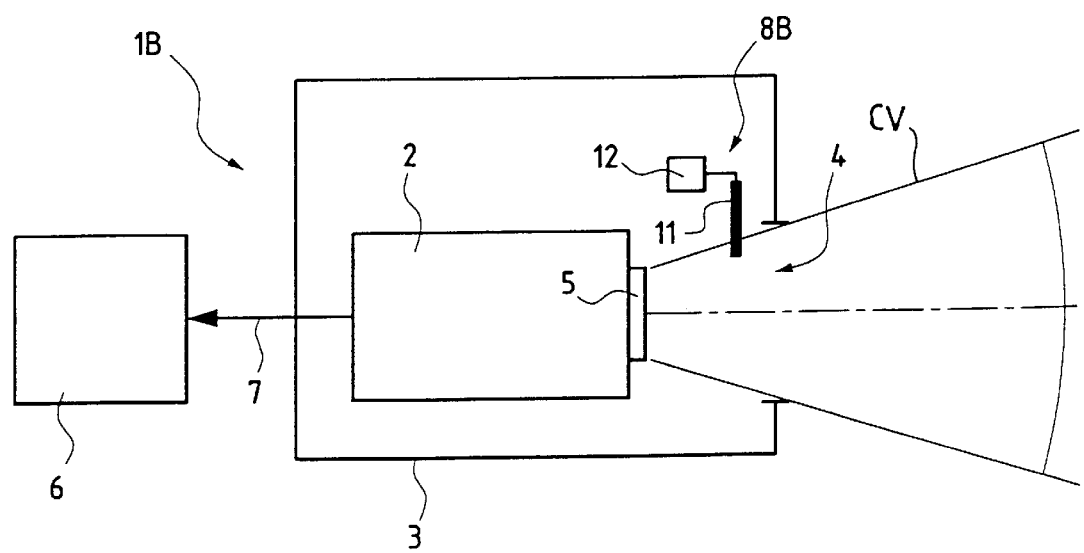

The device in accordance with the invention and represented according to two different embodiments 1A and 1B, in FIGS. 1 and 2 respectively, is able to emit digital video images.

In a known manner, said device 1A or 1B comprises:

picture-taking means 2, for example of the digital video camera type, arranged in a box 3 and able to take pictures of a field of vision CV, through an aperture 4 provided in said box 3. Said means 2 comprise, for this purpose, in a known manner a detection surface 5 furnished, for example, with a matrix of photosensitive diodes or with a charge transfer device matrix detector; and means 6 for using the images formed by the means 2 and received via a link 7, for example electric or radioelectric.

As regards said means 6, these may involve a screen able to present to an operator in real time the scene viewed in said field of vision CV. However, said means 6 may also be recording means, such as a mini video deck for example, the images recorded by these means being restorable off-line on appropriate means (not represented). Such a solution has the advantage, in the case where two groups of picture-taking means 2 are provided, of making it possible to display a mosaic of images which consists of pictures taken by said groups.

In a preferred application, the means 2 are arranged in such a way as to take pictures of the environment fore and/or aft of an aircraft and the means 6 represent a screen mounted in the aircraft's control station. In this case, said device 1A, 1B makes it possible to aid the guidance of the aircraft, especially a civil transport airplane, in particular when moving on the ground over an airport runway.

According to the invention, to allow simple and reliable detection of any image freeze, said device 1A, 1B furthermore comprises means 8A, 8B for forming at least one signal S in the field of vision CV of said picture-taking means 2, so that said signal S appears in at least some of the images produced by said picture-taking means 2, said signal S being formed in such a way as to vary temporally.

Thus, if one sees the same signal permanently on the screen 6, one is aware that the image is frozen, thus making it possible easily and reliably to detect any image freeze. Of course, while the signal S is varying, there is no image freeze.

In the embodiment 1A represented in FIG. 1, the means 8A comprise:

a generator 9 of light pulses, for example a light-emitting diode; and an optical fiber 10 linked to said generator 9 of light pulses and arranged in such a way as to transmit in the field of vision CV of said picture-taking means 2 the light pulses, for example laser pulses, emitted by said generator 9 of light pulses and representing said signal S.

The durations of emission of the pulses and the durations between two successive pulses may be adjusted in such a way as to allow the easiest and most reliable possible visual detection.

For this purpose, the light pulses can of course be produced according to a fixed determined frequency.

Moreover, in the embodiment 1B represented in FIG. 2, the means 8B comprise:

an element 11, for example a linear array, capable of being moved, for example in a rotational or oscillatory manner, in the field of vision CV of the means 2; and a means 12, for example an electric motor, for moving said element 11.

The element 11 is moved in such a way as to appear intermittently (and, as the case may be, at variable locations) in said field of vision CV and hence also in the images formed by the means 2.

Thus, image freeze is detected when, for a determined duration, for example a few seconds, the element 11 appears permanently (at the same location) on the image restoration, carried out by the screen 6, or no longer appears there at all. Of course, the rate and the amplitude of movement are adjustable and are adjusted in such a way as to allow effective visual detection.

In a particular mode of implementation of the device 1B, provision may be made for the element 11 to be moved in such a way as always to lie in the field of vision CV and hence never to disappear from the successive images formed, but simply to move in these latter, so that image freeze is manifested by immobilization of said element 11.

Furthermore, in another embodiment (not represented), there may be provided, rather than an element which moves like the element 11 represented in FIG. 2, an element which deforms temporally, that is to say whose shape and/or size vary so that image freeze is detected upon an absence of deformation for a determined duration.

Additionally, according to the invention, the optical fiber 10 and the element 11 are arranged so that, on each occasion, the signal produced on an image lies at a location of the image, for example in a corner, where it impedes as little as possible the visual restoration of the environment filmed by the means 2.

For the dependability of the device in accordance with the present invention, it is particularly advantageous—as represented in FIGS. 1 and 2—for the means 8A and 8B to be exterior to the picture-taking means 2 and independent of the latter. There can therefore then be no interference between said means 8A and 8B and the electronics of the cameras, of the screens or of the deck. Moreover, said means 8A and 8B can comprise a device for aiding the focusing of the images, so as to improve the quality and the sharpness thereof.

However, it is quite obvious that said means 8A and 8B may be integrated into said picture-taking means 2, for example for the purpose of the compactness of the device of the invention. They are then preferably miniaturized so as to allow a saving of weight and bulk.

The means 8A and 8B may moreover carry useful information, such as the time for example.

What is claimed is:

1. A device for emitting digital video images, the device comprising:

picture-taking means for producing said images; and means for forming at least one signal in the field of vision of said picture-taking means, so that said signal appears in at least some of the images produced by said picture-taking means, wherein:

said signal is formed in such a way as to vary temporally making it possible to detect any image freeze emitted by said device.

2. The device as claimed in claim 1, wherein said signal is an intermittent signal.

3. The device as claimed in claim 1, wherein said signal is formed in such a way as to appear at variable locations in successive images produced by said picture-taking means.

4. The device as claimed in claim 1, wherein said signal is formed in such a way as to appear in variable shapes in successive images produced by said picture-taking means.

5. The device as claimed in claim 1, wherein said signal is formed in such a way as to appear, on each occasion that it appears in the images, in a zone of the image corresponding to the occasion where it does not impede a visual restoration, by said device, of the scene represented in said corresponding image.

6. The device as claimed in claim 5, wherein said zone corresponds to a corner of the corresponding image.

7. The device as claimed in claim 1, wherein said means for forming at least one signal are exterior to said picture-taking means and independent of the latter.

8. The device as claimed in claim 7, wherein said means for forming at least one signal comprise:

a generator that generates light pulses forming said signal; and an optical fiber linked to said generator and arranged in such a way as to transmit in the field of vision of said picture-taking means the light pulses emitted by said generator.

9. The device as claimed in claim 7, wherein said means for forming at least one signal comprise:

an element able to be moved in the field of vision of the picture-taking means; and a means of moving said element, said element being moved in such a way as to appear intermittently in successive images produced by said picture-taking means so as to form said temporally varying signal.

10. The device as claimed in claim 9, wherein said element is moved in such a way as to appear at variable locations in the successive images produced by said picture-taking means.

* * * * *